United States Patent [19]

Mulbrook

[11] Patent Number: 5,489,869
[45] Date of Patent: Feb. 6, 1996

[54] ANTENNA CONTROL UNIT ATTENUATOR AND BI-PHASE MODULATOR

[75] Inventor: Mark M. Mulbrook, Marion, Iowa

[73] Assignee: Rockwell International, Seal Beach, Calif.

[21] Appl. No.: 245,187

[22] Filed: May 17, 1994

[51] Int. Cl.$^6$ .................................................. G06F 7/44
[52] U.S. Cl. ............................................ 327/356; 327/246
[58] Field of Search .......................... 327/65, 108, 246, 327/356, 359, 561, 563

[56] References Cited

U.S. PATENT DOCUMENTS

| | | | |
|---|---|---|---|
| 4,075,566 | 2/1978 | D'Arcangelis | 325/369 |
| 4,156,283 | 5/1979 | Gilbert | 327/359 |
| 4,326,294 | 4/1982 | Okamoto et al. | 455/139 |
| 4,373,207 | 2/1983 | Hecken | 455/139 |
| 4,373,210 | 2/1983 | Karabinis et al. | 455/273 |
| 4,384,366 | 5/1983 | Kaitsuka | 455/278 |
| 4,694,204 | 9/1987 | Nishijima et al. | 327/359 |
| 4,893,350 | 1/1990 | Minamisono et al. | 455/278 |
| 4,969,211 | 11/1990 | Raymond | 455/277 |
| 5,086,241 | 2/1992 | Nakayama | 327/359 |
| 5,122,687 | 6/1992 | Schmidt | 327/359 |
| 5,329,189 | 7/1994 | Ushida et al. | 327/65 |

OTHER PUBLICATIONS

Sedra & Smith, Microelectronic Circuits, Saunders College Publishing, Philadelphia 1991.

Primary Examiner—Timothy P. Callahan
Assistant Examiner—Jeffrey Zewizig
Attorney, Agent, or Firm—Kyle Eppele; M. Lee Murrah; G. A. Montanye

[57] ABSTRACT

An apparatus and method for performing spatial nulling in antenna electronics that provides an integrated solution of signal attenuation and bi-phase modulation. One implementation is comprised of load resistors and field-effect-transistors in a gallium arsenide component configured in such fashion as to provide attenuation and bi-phase capability in response to coupled control signals.

1 Claim, 3 Drawing Sheets

ANTENNA CONTROL UNIT ATTENUATOR AND BI-PHASE MODULATOR

BACKGROUND OF THE INVENTION

This invention relates to wideband communications and more particularly to minimizing the effects of interference in a radio receiver system utilizing an adaptive antenna array.

Any communication system is susceptible to degradation due to interfering conditions. In a wideband transmission system the desired signal is vulnerable to interruption by natural phenomena, interference from other signals, or countermeasures. Countermeasures may take the form of a variety of jamming schemes whose sole purpose is to disrupt the operation of a receiver.

A variety of techniques are currently used to decrease the effects of interference in receivers. Frequency agility, sensitivity time control, sidelobe blanking, random PRF and sidelobe cancellation are but a few of the well known techniques for countering interfering signals. Jammer signals are often non-pulsed or continuous wave and may be sinusoidal, modulated or noise like in nature.

However, in some environments such as GPS, (Global Positioning System), many of the common methods used for cancellation of interfering signals are not applicable. A GPS receiver requires the reception of numerous signals to derive a location from satellites at random locations. Adaptive nulling is an often used technique for rejecting interference. Adaptive nulling rejects interference by effectively reducing the directional sensitivity of the receiver antenna in the direction of the interfering signal. A well known approach to perform adaptive nulling is predicted upon the use of circuitry between the antenna and receiver that in essence nulls the undesired signal by accomplishing weighting functions of the received signal. Use of such weighting functions allows one the opportunity to process the received signal prior to routing it to the receiver so that the receiver only "sees" the desired carrier signal.

Common technical implementations of the weighting function circuitry include the use of a circuit card assembly populated with numerous discrete devices such as amplifiers, mixers and PIN diodes. Each antenna element has a dedicated network of components that controls the attenuation and phase of the received signal. Use of the above described implementation has numerous drawbacks, including but not limited to, increased power and space requirements, premature failure, cost, and operating speed.

Accordingly, a need exists for an improved apparatus and method of accomplishing spatial nulling utilizing antenna control electronics.

SUMMARY OF THE INVENTION

The present invention is an apparatus and method for performing spatial nulling in antenna electronics to reduce the effects of interfering signals or noise. An antenna electronics control unit including highly integrated signal processors that evaluate the signal to control the specific antenna element and systematically provides nulls in a determined direction based upon the received signal with respect to a reference frequency. Nulls may be provided for directions up to one less than the number of antenna elements and associated channel circuitry.

One embodiment of the present invention is implemented in a gallium arsenide component and is comprised of two pairs of transistors coupled as differential amplifiers each having the same load resistors and separate but switchable control signals. With the voltage level of the control signals at zero, the maximum amount of gain is achieved dropping proportional to the control signal voltage level. When the control voltages are swapped, the apparatus becomes bi-phase.

It is therefore an object of the present invention to provide antenna control unit having improved reliability.

It is yet another objective of the present invention to provide antenna control electronics having lower power consumption requirements.

It is yet another objective of the present invention to provide the weight function in a small size at a reduced cost.

It is a feature of the present invention to utilize paired transistors in combination with switchable control signals to accomplish attenuation and bi-phase modulation.

It is an advantage of the present invention to provide an attenuator and bi-phase modulator implemented in an integrated circuit device.

These and other objects, features and advantages are disclosed and claimed in the specification, figures and claims of the present application.

DETAILED DESCRIPTION OF THE DRAWINGS

Figure 1:
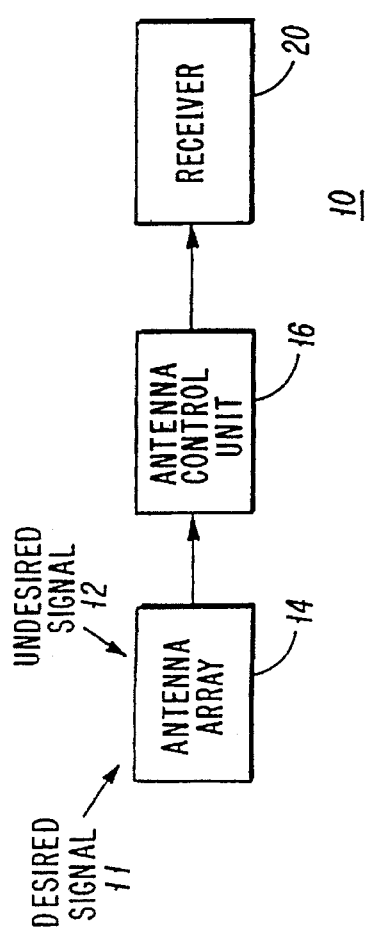
FIG. 1 is a block diagram of the wideband receiver system capable of incorporating the teachings of the present invention.

Referring now to the drawings wherein like items are referenced as such throughout, FIG. 1 illustrates a block diagram of certain portions of a GPS receiver system 10 (such as available from the Assignee) in which the teachings of the present invention may be incorporated. It should be noted that a GPS receiver is used for illustration purposes only and does not imply a limitation for the teachings of the present invention.

A variety of signals, depicted for illustration purposes as a desired signal 11 and an undesired signal 12, are received by an antenna array 14. GPS signals, the desired signal 11 in this instance, are centered at one of two frequencies, 1575.42 megahertz (MHz) and 1227.60 MHz, referred to as "L1" and "L2", respectively, and may be referred to as such throughout this document. The signals L1 and L2 detected by the antenna array 14 are then coupled to a antenna control unit 16. The antenna control unit 16 is then coupled to a receiver 20. The GPS signal is a spread spectrum signal, separated in signal processing. The reception of three satellites is needed to derive location.

Figure 2:
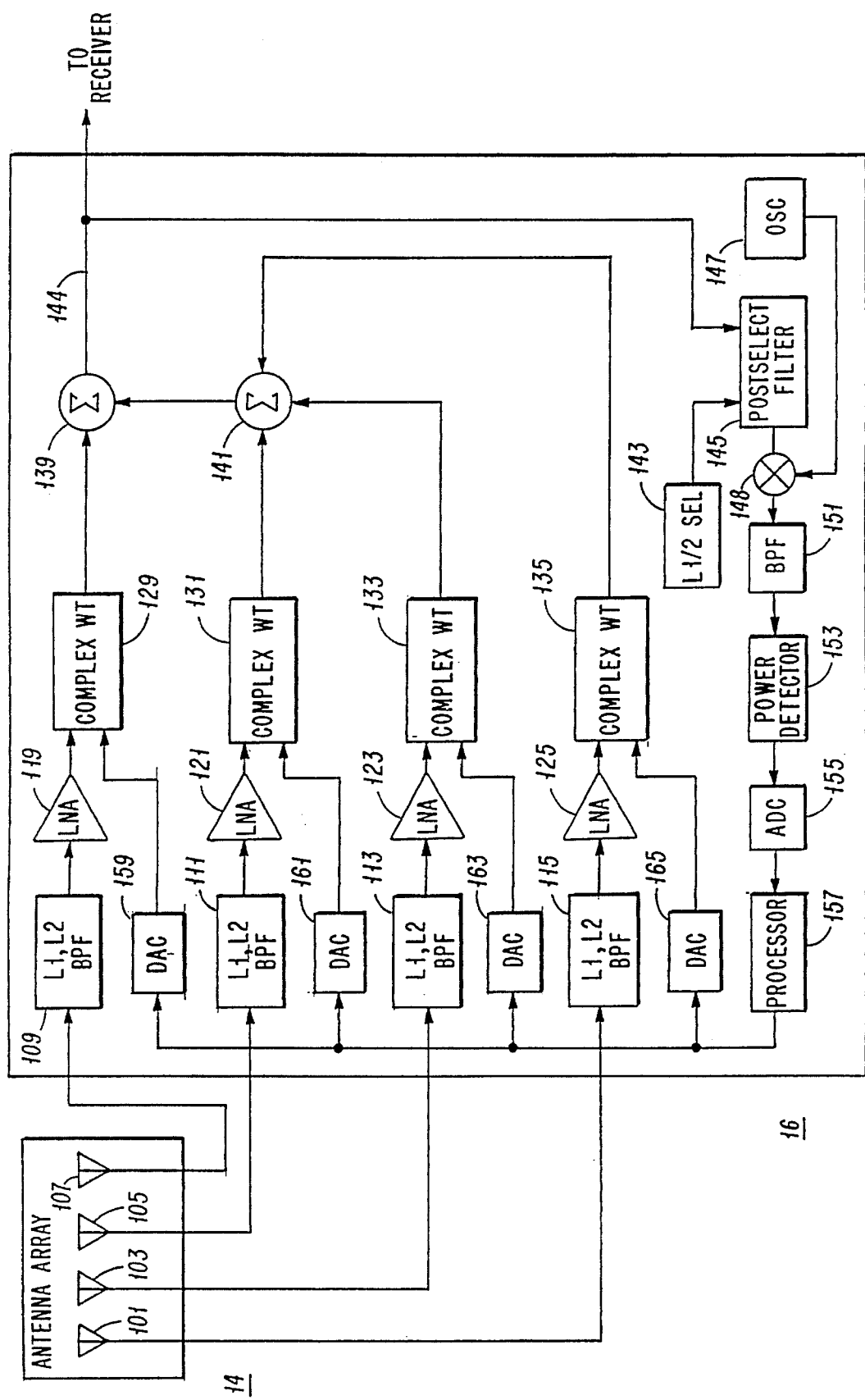
FIG. 2 is a block diagram of a portion of a GPS receiver incorporating the teachings of the present invention.

FIG. 2 illustrates a more detailed depiction of the antenna array 14 and the antenna control unit 16 of FIG. 1. The antenna array 14 is comprised of four antenna elements 101, 103, 105 and 107 which all detect the downlink signals from the constellation of GPS satellites (not shown). Although depicted as a four channel device, it is understood that any number of desired channels may be utilized. For the sake of simplicity only one channel is described in detail, the elements and connections of additional channels being substantially similar and easily understood from the provided drawings and specification. Signals that are detected by antenna element 107 are routed through a preselect filter 109, a low noise amplifier 119 and a complex weight function 129. (Similar processing is provided for the other three channels beginning with antenna elements means 101, 103 and 105). It should be noted that the filter 109 and the amplifier 119 are not required for the function of the control unit. The outputs of all complex weight function means 129, 131, 133 and 135 are summed via summing means 139 and 141 thereby forming an output signal 144.

The signal 144 is translated to a lower frequency via selector means 143 and post select filter 145, down converted through a mixer 148, passed through a bandpass filter 151 and a power detector 153 where the power level of the signal is measured. The output of the power detector 153 is coupled to an analog-to-digital converter 155 and in turn to a processor 157. The processor 157 is in turn coupled to a plurality of digital-to-analog converters (DACs) 159, 161, 163 and 165 and in turn to complex weight function means 129, 131, 133 and 135. It should be noted that the processor 157, and the DACs (159–165) may be any readily available devices.

Figure 3:
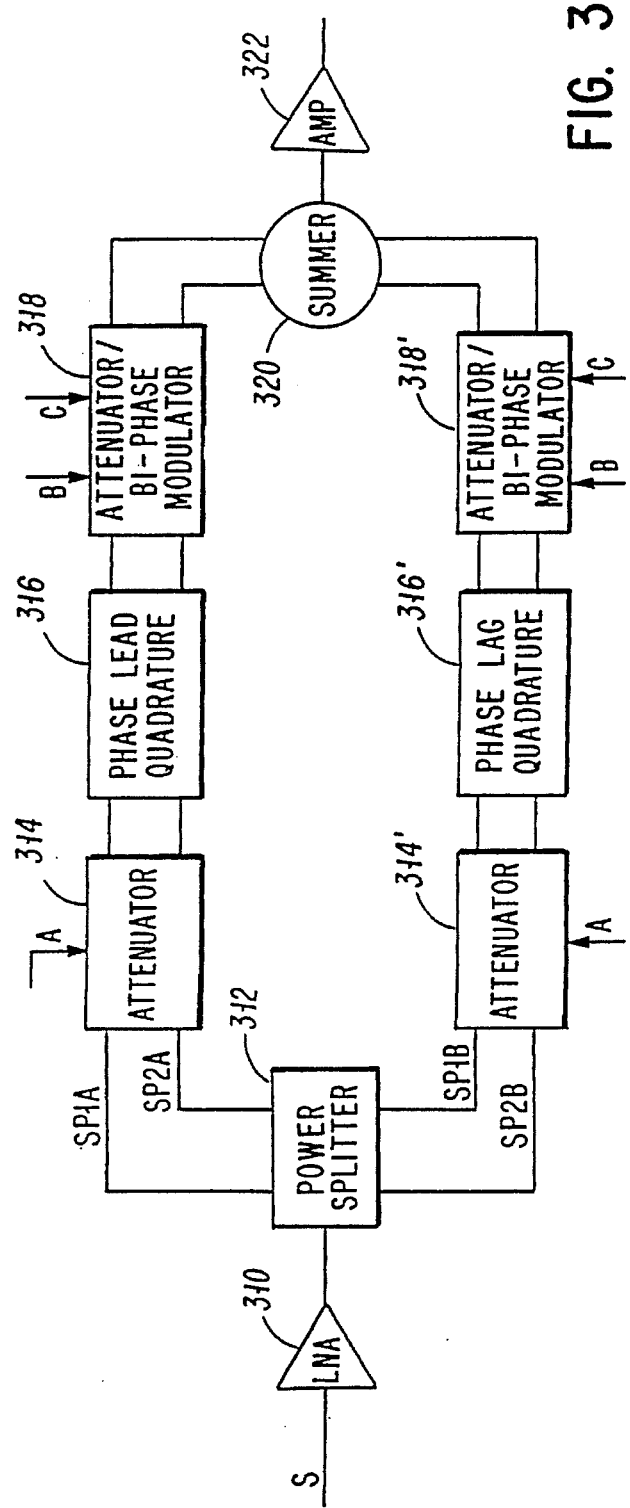
FIG. 3 is a block diagram of a portion of the antenna control unit of FIG. 2.

FIG. 3 illustrates a block diagram of a portion of an antenna control unit incorporating the teachings of the present invention. A signal S received by an antenna is coupled to a low noise amplifier 310. The output of the amplifier 310 is coupled to a power splitter 312 which has as its output signals that are 180° out of phase, SP1A (0°) and SP2A (180°), SP1B (0°) and SP2B (180°). Signal pair SP1A, SP2A is coupled to an attenuator 314 which also receives a control signal A from a logic device (not shown). The output of attenuator 314 is coupled to a phase lead quadrature 316. The output of the phase lead quadrature 316 is coupled to an attenuator/bi-phase modulator 318. The attenuator/bi-phase modulator 318 receives control signals B and C. A similar circuit is provided for signal pair SP1B, SP2B as depicted in FIG. 3. The outputs of attenuator/bi-phase modulators 318, 318' are coupled to a summer 320 which in turn is coupled to an output amplifier 322.

In operation, the low noise amplifier reduces the signal-to-noise ratio of the input signal S and routes its output to the power splitter 312 which then creates the differential signals described above. The attenuator 314 may be implemented as a differential amplifier and primarily balances the 0° and 180° signals so as to yield a more accurate signal. The phase lead quadrature 316 may be implemented as a high pass filter (low pass filter 316') and provides a quadrature relationship for the differential signals relative to each other. The attenuator and bi-phase modulator then provides a magnitude for attenuation of the received signal S and by being able to switch from the 0° to 180° signals via control signals B and C, the appropriate bi-phase to the attenuation. Summer 320 combines the outputs of the attenuator and bi-phase modulators 318, 318' thereby providing the phase in the appropriate quadrant. The output amplifier converts the voltage of the output signal out of summer 320 to a 50 ohm signal.

Figure 4:
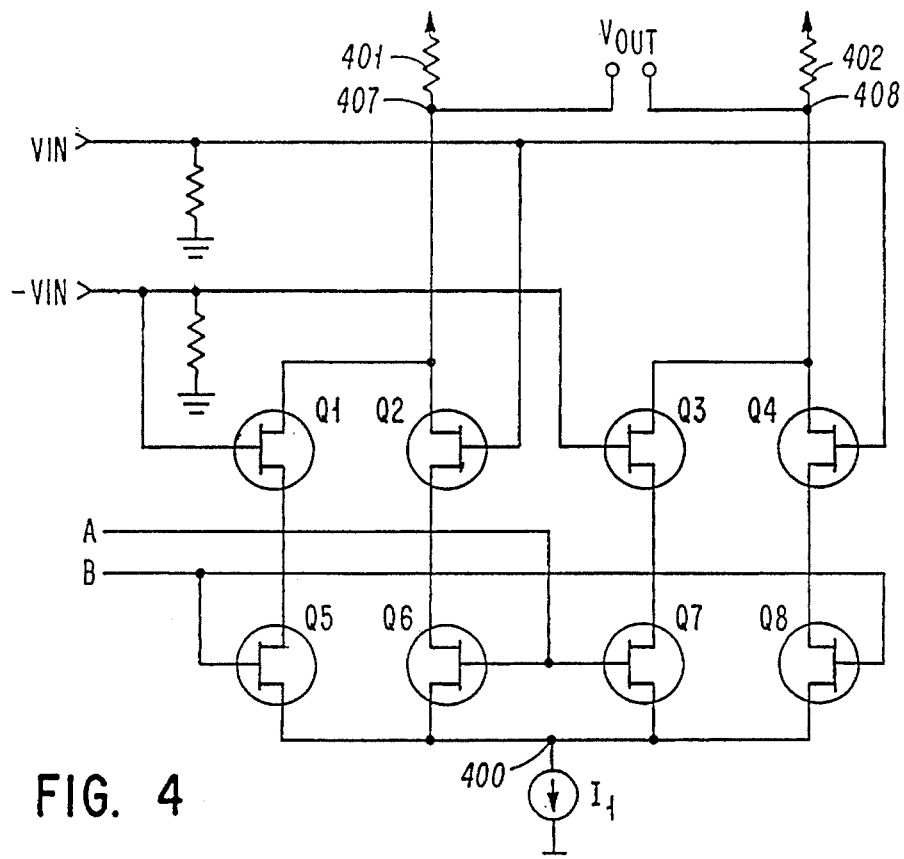
FIG. 4 is a schematic diagram of one embodiment of the present invention as used in the latter attenuator stage of FIG. 3.

FIG. 4 illustrates a schematic diagram of one implementation of an attenuator and bi-phase modulator 318 of FIG. 3. The input signals $+V_{in}$, $-V_{in}$ are representative of the output of devices 316, 316'. Two resistors and eight transistors, shown as field-effect-transistors have their electrodes coupled as shown thereby forming pairs of differential amplifiers. While additional components, such as resistors or capacitors, may be utilized to provide biasing, isolation or other performance desires, the circuitry represented by FIG. 4 represents the essential components and configuration for implementing the present invention.

Transistor $I_1$ serves as the current source for the differential amplifier. Transistors $Q_1$ and $Q_4$ form one differential amplifier pair, while transistors $Q_2$ and $Q_3$ serve as a second differential pair. Both transistor pairs $Q_1$, $Q_4$ and $Q_2$, $Q_3$ have the same load resistors. Although transistors $Q_1$ and $Q_2$ are of different differential pairs, each shares the same load resistor 401. Likewise, on the differential side of the amplifier, transistors $Q_3$ and $Q_4$ share the same load resistor 402. Transistor $Q_5$ is used to control the gain of transistor $Q_1$ by adding source degradation which thereby lowers the gain. Transistor $Q_8$ controls transistor $Q_4$ and has the same control voltage as transistor $Q_5$ so that the differential pair has the same attenuation. Transistors $Q_2$ and $Q_3$ are similarly controlled by transistors $Q_6$ and $Q_7$.

With the control voltage, signal A or B, at zero, the maximum amount of gain is achieved with the other control voltage held at a negative voltage. As the control voltage value goes negative the gain drops proportional so that with both of the control voltages at a negative reference of three and one-half volts the differential pair has minimal gain.

The above described transistors that share the same load resistor are driven by the differential signal such that one amplifier output signal is 180° out of phase to the other. As transistors $Q_2$ and $Q_3$ are held at a constant minimal gain transistors $Q_1$ and $Q_4$ are used to change the amplifier gain. When the control voltages are swapped, the output signal changes phase by 180°, because the transistors with the inverse signal now have more gain. As the control voltage for the attenuation approaches the fixed voltage, the sum of the two signals on the load resistors will cancel. This summing effect of the two signals 180° out of phase, leads to an extended attenuation range. Thus, the two amplifiers that sum with the same load resistor are driven by inverse signals and have opposite control voltages. The two transistors that share the same control voltage are driven by a differential signal and do not share the same load resistor. This provides a gain that is variable anywhere along the 0° and 180° axis on a polar chart.

Figure 5:
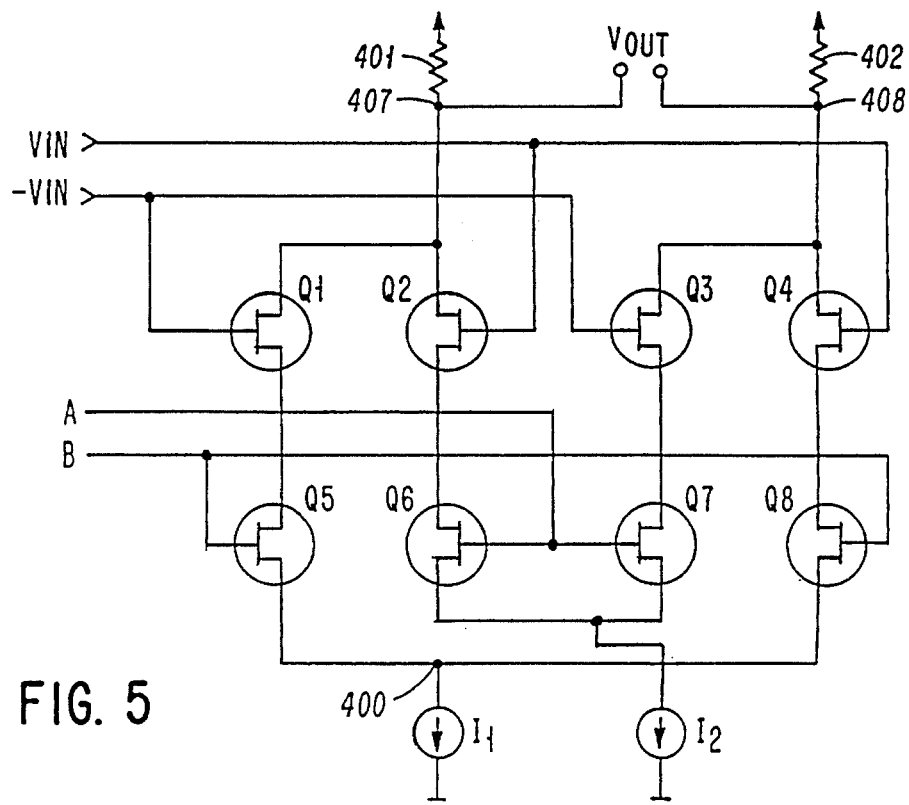
FIG. 5 is a schematic diagram of an alternate embodiment of the present invention.

An alternate embodiment of the apparatus of FIG. 4 is depicted in FIG. 5. The configuration of the components has been altered to provide two current sources. Functionally, the primary difference from the apparatus of FIG. 4 is the biasing of the differential pairs.

Those skilled in the art will readily recognize that various modifications and changes may be made to the present invention without departing from the true spirit and scope thereof, which is set forth in the following claims.

I claim:

1. An apparatus for use in antenna interface circuity comprising:

a first attenuating coupled to a voltage input signal and a first control signal;

a second attenuator coupled to a second voltage input signal and a second control signal; and a dual current source coupled to each attenuator;

means for switching coupled to the first and second control signal;

wherein the first and second voltage signals are 180 degrees apart and that the by switching the signals to the attenuators the apparatus is bi-phase; and wherein the first and second attenuators are comprised of paired differential amplifiers.

\* \* \* \* \*